United States Patent
Rowley et al.

(10) Patent No.: US 7,118,138 B1
(45) Date of Patent: Oct. 10, 2006

(54) QUICK CONNECT FASTENER AND CONNECTION

(75) Inventors: William W. Rowley, Chagrin Falls, OH (US); Raymond Grella, Burton, OH (US); Jim Kubes, Middlefield, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 155 days.

(21) Appl. No.: 10/605,279

(22) Filed: Sep. 19, 2003

(51) Int. Cl.
*F16L 17/00* (2006.01)
*F16B 21/02* (2006.01)

(52) U.S. Cl. .................. 285/332.2; 285/377; 403/348; 403/349; 403/350

(58) Field of Classification Search ........ 403/348–350; 285/284.1, 332.1, 332.2 X, 376, 377 X, 386–388, 285/401, 402, 377, 332.2; 411/433, 437, 411/539, 540
See application file for complete search history.

(56) References Cited

U.S. PATENT DOCUMENTS

| | | | |
|---|---|---|---|
| 343,089 A * | 6/1886 | Buchtel | 285/377 |
| 1,490,771 A * | 4/1924 | Fortin et al. | 285/376 |
| 2,931,264 A * | 4/1960 | Dallman | 411/437 |
| 3,679,237 A * | 7/1972 | De Angelis | 285/387 |
| 3,945,669 A | 3/1976 | Bochory | |
| 3,977,708 A | 8/1976 | Jopp | |
| 4,008,642 A | 2/1977 | Becker | |
| 4,175,605 A | 11/1979 | Johnson | |
| 4,226,164 A * | 10/1980 | Carter | 411/433 |
| 4,305,180 A * | 12/1981 | Schwartz | 439/296 |
| 4,435,111 A | 3/1984 | Mizusawa | |
| 4,441,843 A | 4/1984 | Wright | |
| 4,477,109 A * | 10/1984 | Kleuver | 285/376 |
| 4,657,458 A | 4/1987 | Woller | |
| 4,703,957 A | 11/1987 | Blenkush | |
| 4,707,768 A | 11/1987 | Ball | |
| 4,723,796 A | 2/1988 | Nattel | |
| 4,828,444 A | 5/1989 | Oshida | |
| 4,832,551 A | 5/1989 | Wollar | |
| 4,842,437 A | 6/1989 | Egner | |
| 4,907,924 A | 3/1990 | Hellon | |
| 4,934,859 A | 6/1990 | Dixon | |
| 5,064,325 A | 11/1991 | McRoskey | |
| 5,348,353 A | 9/1994 | Deweerdt | |
| 5,516,156 A * | 5/1996 | Williamson | 285/212 |
| 5,536,125 A | 7/1996 | Gaw | |
| 5,556,218 A | 9/1996 | Homer | |
| 5,627,610 A | 5/1997 | Marui et al. | |
| 5,628,599 A | 5/1997 | Eakin | |

(Continued)

*Primary Examiner*—Daniel P. Stodola
*Assistant Examiner*—Victor MacArthur
(74) *Attorney, Agent, or Firm*—Buckingham, Doolittle & Burroughs, LLP; Louis F. Wagner (57) ABSTRACT

A connecting fastener is provided. The fastener includes a cylindrical base that includes a first end and a second end and a wall. A central bore is defined in the base and an aperture is defined in the wall. At least one projection extends from an inner surface of the wall into the central bore proximate the first end of the base. A cylindrical collar has a first end disposed proximate the second end of the base, defines a central bore and includes a wall that defines a gap in the wall and a central bore. A shoulder is connected to and extends between the second end of the base and the first end of the collar along at least a portion of the respective circumferences of the base and the collar. A method of connecting tubing is also provided.

18 Claims, 10 Drawing Sheets

U.S. PATENT DOCUMENTS

| | | |
|---|---|---|
| 5,672,036 A | 9/1997 | Medal |
| 5,806,140 A | 9/1998 | Carlson et al. |
| 5,890,857 A | 4/1999 | Herrera |
| 6,109,848 A | 8/2000 | Werner |
| 6,234,544 B1 | 5/2001 | Bartholomew |
| 6,302,449 B1 | 10/2001 | Clayton |
| 6,447,017 B1 | 9/2002 | Gilbreath et al. |
| 6,557,900 B1 | 5/2003 | Austin |
| 6,902,210 B1 * | 6/2005 | Rowley ................. 285/386 |
| 2002/0079695 A1 | 6/2002 | Campbell et al. |
| 2002/0106259 A1 | 8/2002 | Kaufman |
| 2002/0108609 A1 | 8/2002 | Elkins |
| 2002/0128607 A1 * | 9/2002 | Haury et al. |
| 2002/0168244 A1 | 11/2002 | DiStasio et al. |
| 2003/0116967 A1 | 6/2003 | Kornau et al. |
| 2003/0137148 A1 | 7/2003 | Andre et al. |
| 2003/0141047 A1 | 7/2003 | Lamich |

* cited by examiner

FIG-12

QUICK CONNECT FASTENER AND CONNECTION

BACKGROUND OF INVENTION

The invention relates to the field of fastening devices for tubing. In particular, the invention relates to plumbing fastening devices which can be slipped over and around a pre-formed shoulder of a sealing surface on a tube and engage a mating receptacle, to effect a substantially leak-proof connection of the tube.

Figure 1:
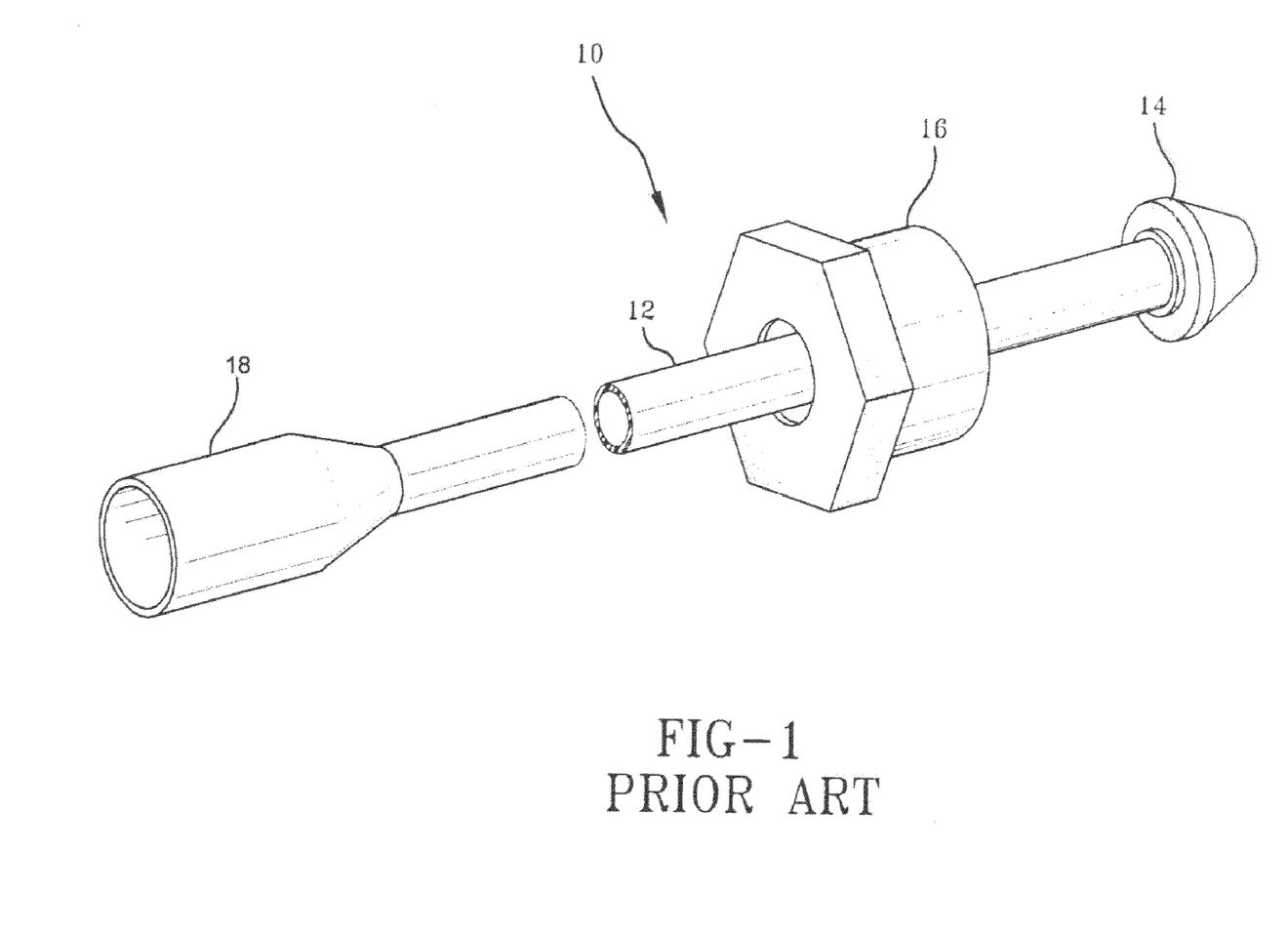
FIG. 1 is a perspective view of a connector of the prior art.

In the plumbing art, it is often necessary to connect two plumbing tubes together in end-to-end fashion or to connect a plumbing tube to a receptacle. The connections have typically been made by employing an internally threaded nut on one tube and a mating externally threaded receiving device on the other tube (or on the receptacle). However, a plumbing tube often has a connecting end that includes a sealing surface. The sealing surface is usually an enlarged area that provides greater surface contact to reduce or eliminate any leaks that may occur at the plumbing connection. For example, as shown in FIG. 1, a connector of the prior art 10 includes a tube 12 with an enlarged sealing surface 14.

In effecting sealing engagement, an internally threaded nut 16 connects to a mating externally threaded receptacle (not shown). This type of connection suffers from the fact that nut 16 must be inserted onto tube 12 prior to the formation of enlarged sealing surface 14 during the production process or prior to any processing on an opposed end such as the formation of a belled end 18. Insertion of nut 16 onto tube 12 during the production process detrimentally incurs additional manufacturing time and expense. Also, the placement of nut 16 on tube 12 during manufacturing severely limits the ability of nut 16 to be replaced or installed in the field, again leading to additional time and expense to make repairs to a plumbing connection.

Moreover, threaded fasteners of the prior art require circumferential rotational movement, i.e. turning, to effect engagement, and often, the number of turns exceeds two to three times about the original starting point. Because many plumbing connections are made in areas having restricted space, it is difficult and time-consuming to turn the prior art fasteners the required number of times to effect a complete, sealed connection, if possible at all.

Accordingly, it is desirable to develop a fastener that overcomes the disadvantages of the prior art by having the ability to be inserted onto a respective tube after fabrication of the tube and requires less than a full turn to effect sealing engagement.

SUMMARY OF INVENTION

In accordance with the present invention, there is provided a fastening device which is inserted over an enlarged sealing surface of a tube and requires only about a one-quarter turn to effect sealing engagement against a mating surface. A fastening connection that utilizes the device and a method of connecting tubing using the device are also provided by the present invention.

In one aspect of the invention, a connecting fastener is provided. The fastener includes a cylindrical base that includes a first end, a second end and a wall. The fastener defines a central bore and an aperture in the wall. The aperture is defined in the wall of the base at the second end of the base and extends toward the first end of the base. The aperture is of a sufficient width to allow an end and sealing surface of a corresponding tube to pass through.

At least one projection extends from an inner surface of the wall into the central bore proximate the first end of the base. The projection includes at least one ramp surface, a stopping wall, a retaining wall and a locking surface.

A cylindrical collar having a first end is disposed proximate the second end of the base. The collar includes a wall with an outer diameter that is typically less than the outer diameter of the wall of the cylindrical base and defines a gap in the wall and a central bore. The gap extends parallel to the longitudinal axis of the collar from the first end of the collar to the second end of the collar and is of a width sufficient to allow a corresponding tube to be inserted through the gap with the application of force.

Connecting the base and the collar is a shoulder, which extends between the second end of the base and the first end of the collar along at least a portion of the respective circumferences of the base and the collar.

In another aspect of the invention, a fastening connection is provided. The fastening connection includes a connector member and a receiving member. The connector member includes a cylindrical base with a first end, a second end and a wall, and defines a central bore and an aperture in the wall. At least two projections extend from an inner surface of the wall into the central bore proximate the first end of the base. Each projection includes a ramp surface, a stopping wall, a retaining wall and a locking surface.

A cylindrical collar having a first end is disposed proximate the second end of the base of the connector member and includes a wall with an outer diameter that is less than the outer diameter of the wall of the cylindrical base. The collar defines a gap in the wall and a central bore. A shoulder connects the base and the collar, extending between the second end of the base and the first end of the collar along at least a portion of the circumferences of the base and the collar.

The receiving member of the fastening connection includes a first end, a second end and an outer diameter that is less than the distance between the at least two projections on the base of the receiving member across the bore of the connector member. Means to secure at least a portion of the body of the receiving member in the central bore of the connector member are defined on the receiving member. The means may include at least two opposing tabs projecting from the outer surface of the cylindrical body near the first end of the body. The tabs of the receiving member engage corresponding locking surfaces of the projections of the base of the connector member.

In yet another aspect of the invention, a method of connecting tubing is provided. The method includes the steps of providing a tube, a connector member and a receiving member. The tube includes an end and a sealing surface near the end of the tube. The sealing surface includes a shoulder and a radiused or cup-shaped taper. The connector member includes a cylindrical base with a first end, a second end and a wall, and defines a central bore and an aperture in the wall. At least two projections extend from an inner surface of the wall into the central bore proximate the first end of the base. Each projection includes a ramp surface, a stopping wall, a retaining wall and a locking surface.

A cylindrical collar having a first end is disposed proximate the second end of the base of the connector member and includes a wall with an outer diameter that is less than the outer diameter of the wall of the cylindrical base. The collar defines a gap in the wall and a central bore. A shoulder connects the base and the collar, extending between the second end of the base and the first end of the collar along at least a portion of the circumferences of the base and the collar.

The receiving member of the fastening connection includes a first end, a second end and an outer diameter that is less than the distance between the at least two uniformly spaced projections on the base of the connector member across the bore of the connector member. The receiving member also defines a central bore. Means to secure at least a portion of the body of the receiving member in the central bore of the receiving member are defined on the connector member. The means may include at least two opposing tabs projecting from the outer surface of the cylindrical body near the first end of the body that cooperate with the projections of the connector member.

The method also includes the step of passing the operational end of the shaft of the tube through the aperture defined in the wall of the cylindrical base, and past the first end of the base. The bevel of the tube is passed through the aperture and into the central bore of the base of the connector member and the portion of the shaft of the tube below the bevel is pressed through the gap defined in the collar and into the central bore of the collar. The connector member is moved along the tube toward the operational end of the tube until a surface at the first end of the collar and the shoulder of the bevel are in contact with one another.

The operational end of the shaft is inserted into the central bore of the receiving member until the first end of the receiving member uniformly contacts the taper of the bevel of the tube, whereby the first end of the receiving member enters the central bore of the base of the connector member. The connector member is rotated to secure the receiving member and the connector member together.

More particularly, the receiving member and the connector member are secured by the engagement of the opposing projection members of the base of the connector member with corresponding tabs of the receiving member upon rotation of the connector member. The rotation to effectuate the engagement is about one quarter of the distance of the circumference of the outer surface of the base of the connector member.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION

Referring now to the drawings wherein the showing is for the purpose of illustrating the preferred embodiment of the invention only and not for purposes of limiting the same, the figures show the quick connect fastener and the fastening connection of the instant invention.

Figure 2:
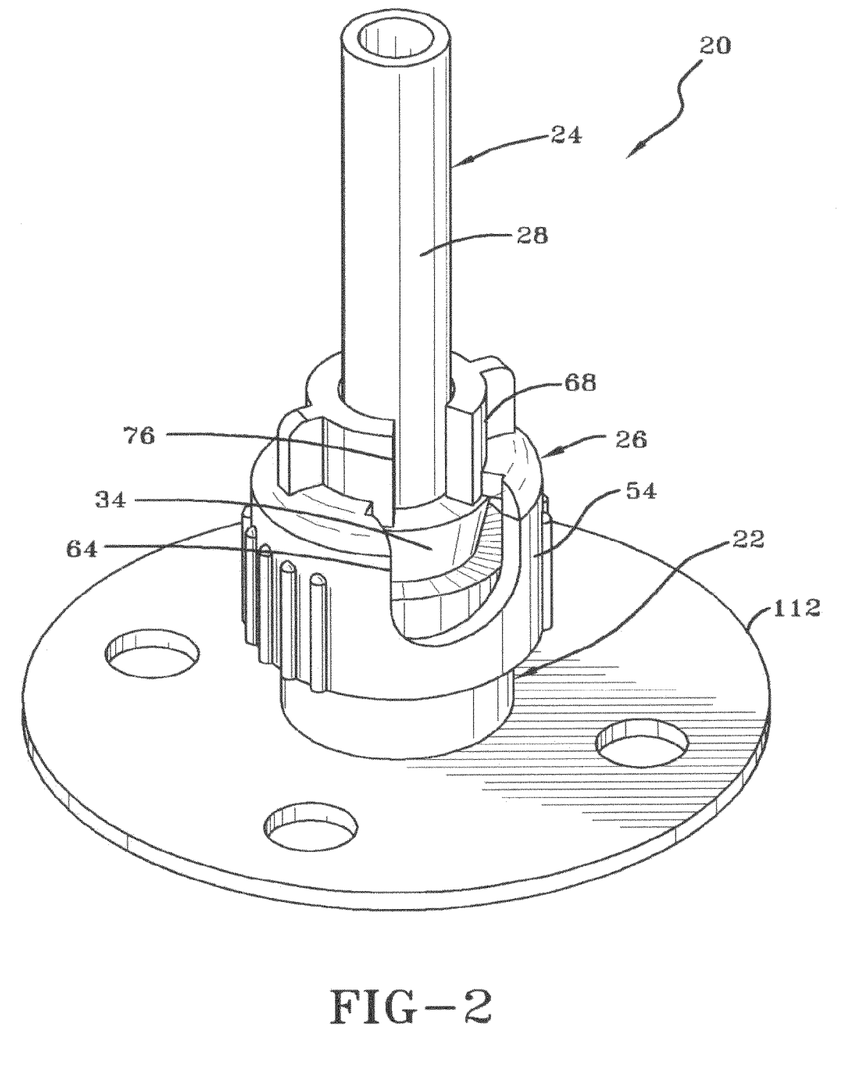
FIG. 2 is a perspective view of a fastening connection in accordance with an exemplary embodiment of the invention, including a receiving member, a tube and an insertion member.
Figure 3:
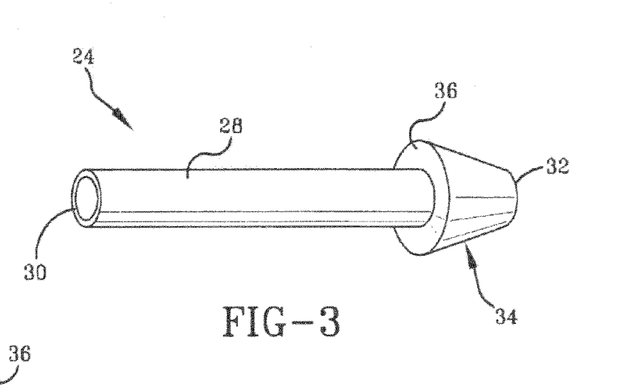
FIG. 3 is a perspective view of a tube having a sealing surface shown in FIG. 2.
Figure 3A:
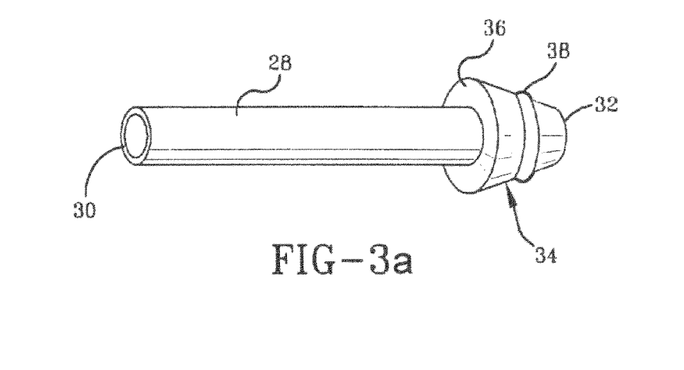
FIG. 3*a* is another embodiment of the invention showing an "o"-ring positioned within the sealing surface.
Figure 3B:
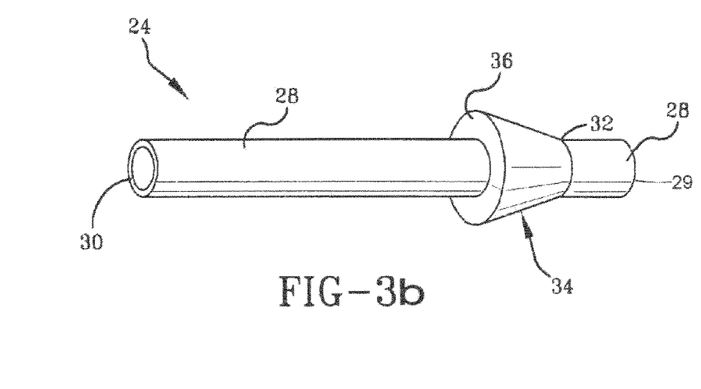
FIG. 3*b* is yet another embodiment of the invention showing the sealing surface removed from an end of the tube.
Figure 3C:
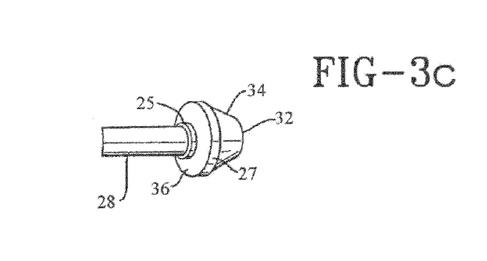
FIG. 3*c* is a reduced perspective view of yet another embodiment of the invention illustrating a collar and fillet at a distal end of the sealing surface.
Figure 3D:
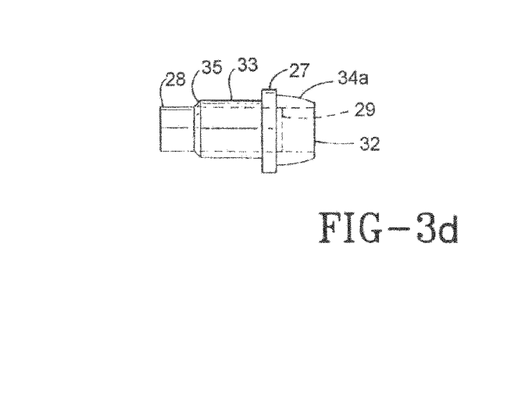
FIG. 3*d* is a reduced side elevational view of still yet another embodiment of the invention illustrating an over-molded end cap with tubing end and internal diameter shown in ghost lines.

One embodiment of the invention is illustrated in FIG. 2, and shows that the fastening connection 20 includes an essentially cylindrical hollow receiving member 22 that both receives and secures (typically polymeric but not limited to such) a tube 24 in combination with a fastening connector 26. As better illustrated in FIG. 3, tube 24 includes a shaft 28 (of essentially any length) that defines a central orifice 30 through which a fluid, typically a liquid or gas, although transport of solids is contemplated herein, passes. Tube 24 also includes a sealing surface end 32 with a sealing surface 34 proximate sealing surface end 32. Sealing surface 34 includes a shoulder 36 and a surface that is tapered or cone-shaped or radiused, wherein the taper decreases as it proceeds toward sealing surface end 32. While the surface of shoulder 36 is shown as perpendicular to shaft 28, shoulder 36 may also be angled, and include an optional fillet 25 and sealing surface collar 27 illustrated in FIG. 3*c*, as dictated by the specific application. In another embodiment of the invention where maximum sealing is required, an optional "o"-ring 38 (typically rubber) is positioned in a groove disposed in sealing surface 34 as illustrated in FIG. 3*a*. There is no need to have the end of the sealing surface 32 be coterminous with tubing end 29 as illustrated in FIGS. 3*b* and 3*d*. Once again, as dictated by the end-use application or consumer preference or processing considerations, a second collar 33 distal to the sealing surface collar 27 may be present as well as optional bevel 35, better illustrated in FIG. 3*d*. This is often preferred when the sealing end on tube 28 is formed by overmolding and tubing end 29 is recessed within the sealing end.

Figure 4:
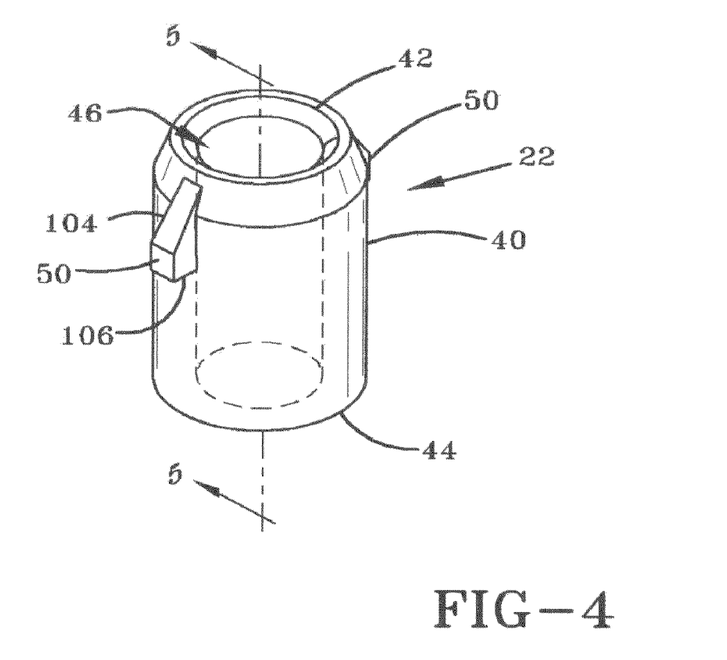
FIG. 4 is perspective view of the receiving member of the fastening connection of the invention, with internal features represented by broken lines.
Figure 5:
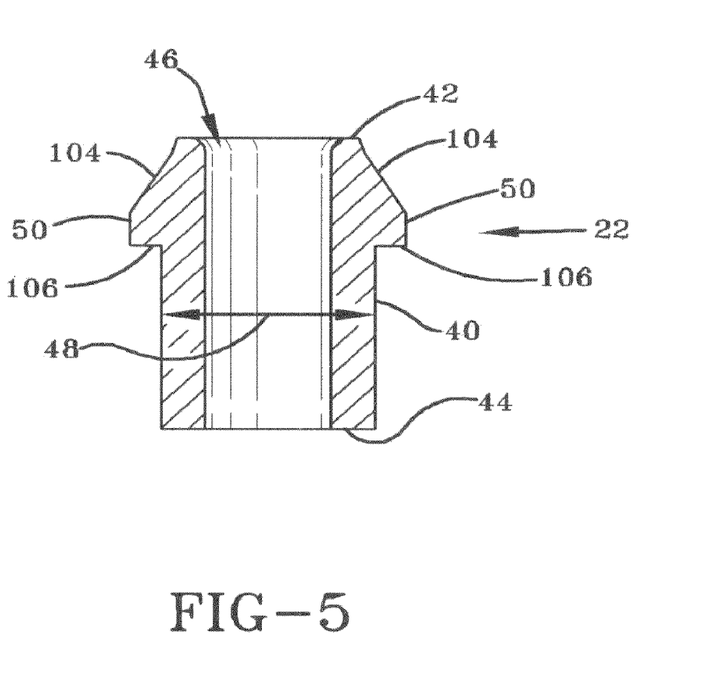
FIG. 5 is a side cross-sectional view of the receiving member of FIG. 4, taken down the center of the member along line 5—5 in FIG. 4.
Figure 6:
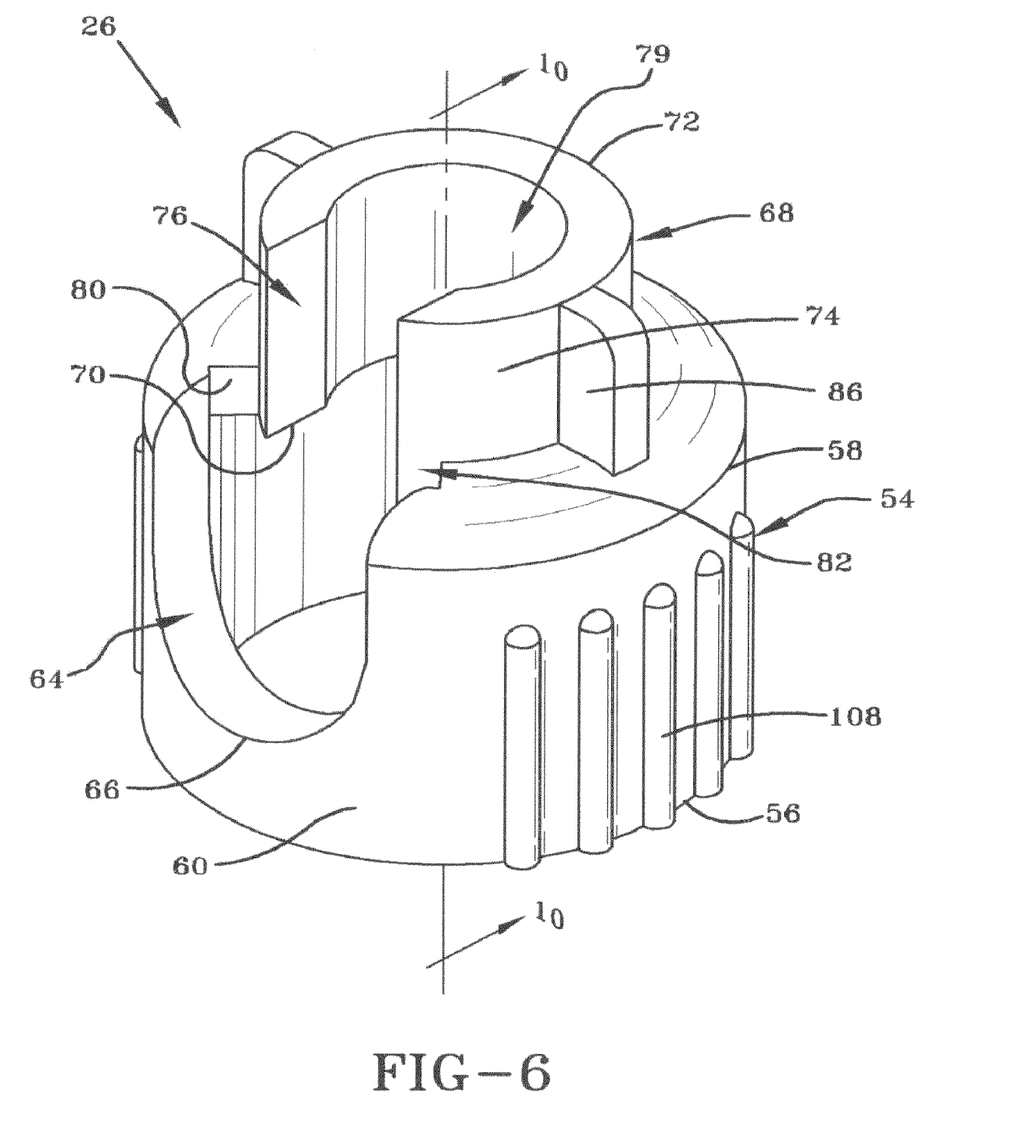
FIG. 6 is a perspective view of one side of the fastening connector member.
Figure 7:
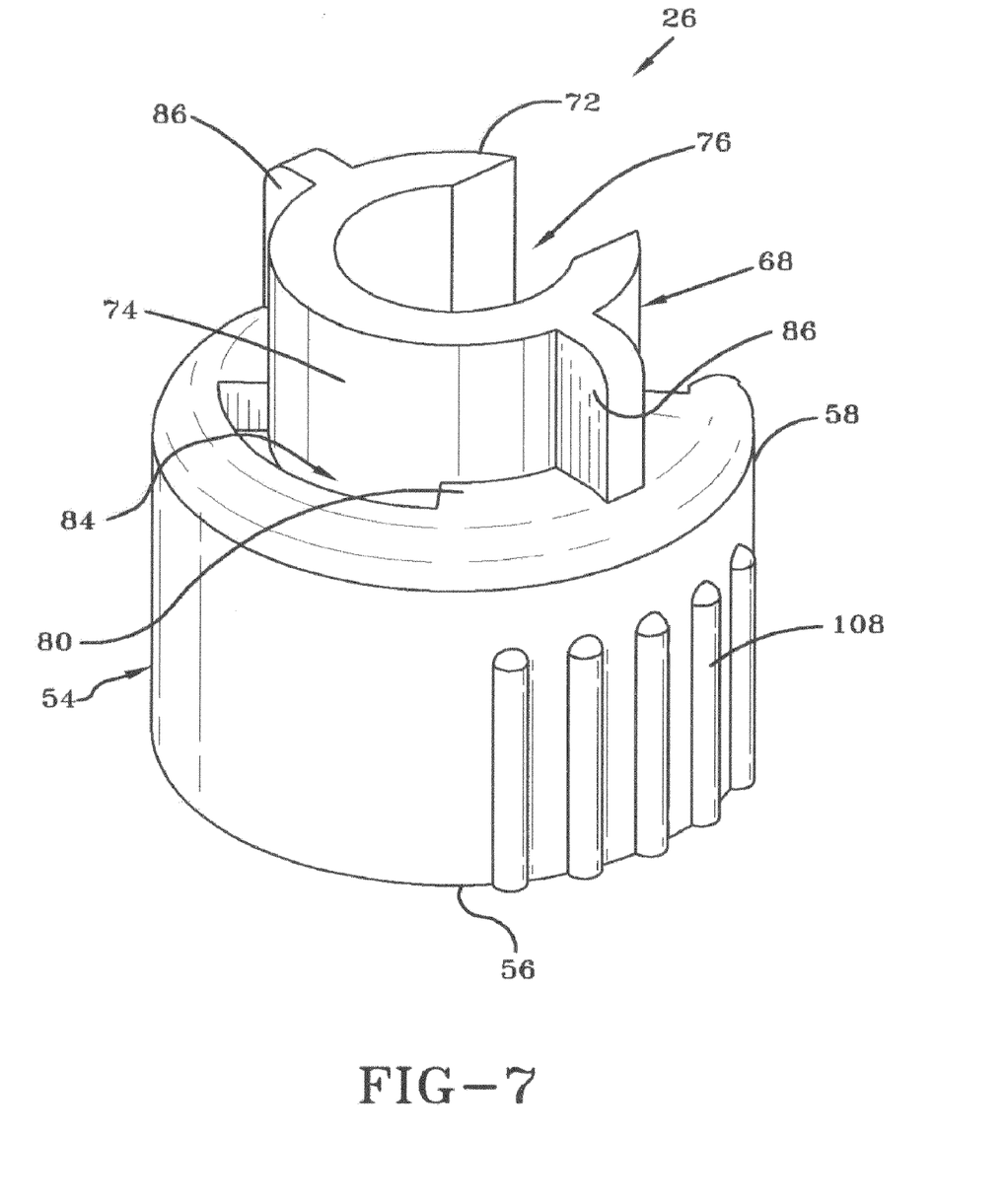
FIG. 7 is a perspective view of an opposite side of the fastening connector of FIG. 6.
Figure 8:
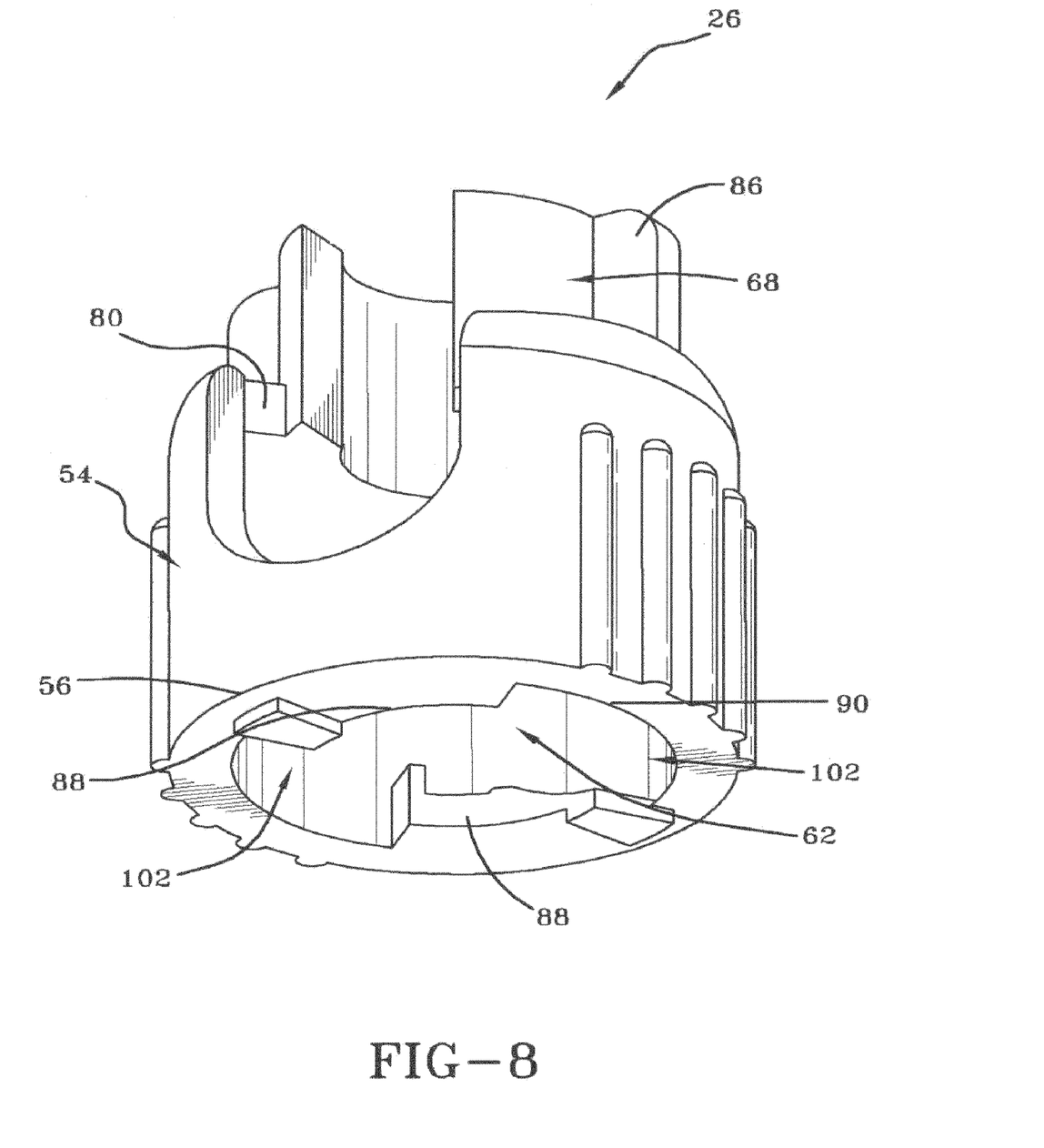
FIG. 8 is a perspective view of the bottom of the fastening connector of FIG. 6.
Figure 9:
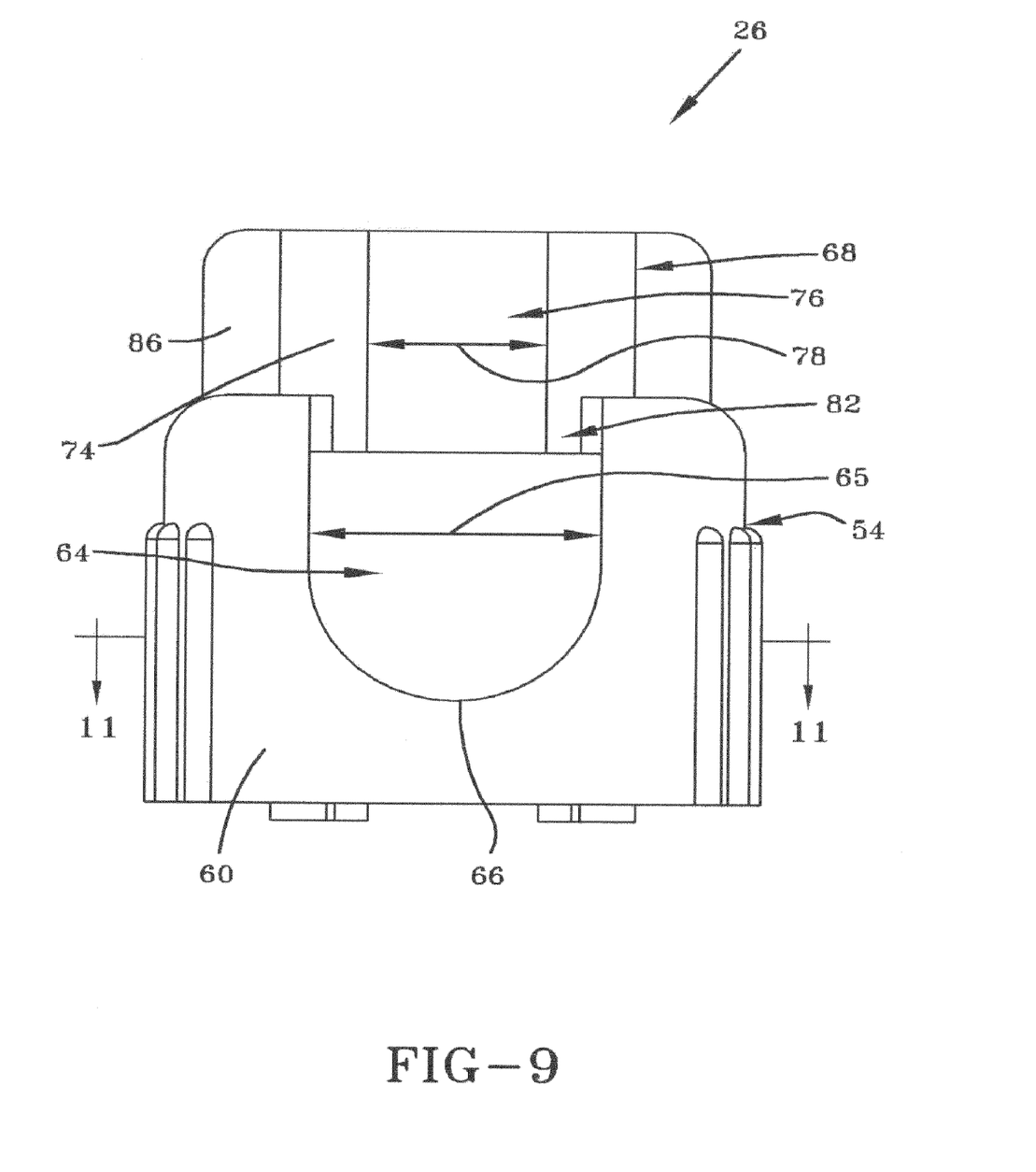
FIG. 9 is a side elevational view of the fastening connector of FIG. 6.

Turning now to FIGS. 4 and 5, receiving member 22 includes a cylindrical body 40 having a first end 42 that is generally both internally and externally beveled in a preferred embodiment and an opposed second end 44 of generally essentially any length. Cylindrical body 40 defines a central bore 46 and an outer diameter 48. At least two opposing tabs 50 project from the exterior surface of cylindrical body 40 proximate generally to its first end 42. Additional details regarding receiving member 22 and tabs 50 will be provided below. It is recognized that receiving member may be a fitting 112 or a second tube configured so as to have an end shape as illustrated in FIGS. 4–5 as for example by injection molding With reference to FIGS. 6–10, the details of connector member 26 are shown. Connector 26 includes a cylindrical base 54 which has a first end 56, a second end 58 and a wall 60. Defined in the center of base 54 is a central bore 62. Defined in wall 60 is an opening 64 that extends from second end 58 of base 54 to a distance removed from first end 56. However, opening 64 stops short of first end 56 to maintain the integrity of wall 60 about the circumference of cylindrical base 54.

Opening 64 is of a shape and a width 65 that allows taper 34 or cone-shaped sealing surface 34*a* (referring back to FIGS. 3 and 3*d*) of corresponding tube 24 to pass through when a longitudinal axis of the tube is at an angle of between 10–80°, preferably 30–60°, more preferably 45°, to the longitudinal axis of the connector 26. For example, for a tube 24 having an outer diameter of about 6 mm, bevel 34 may reach a maximum outer diameter at shoulder 36 or collar 27 of about 10 mm. Opening 64 then has a width 65 in a range of from about 9 mm to about 11 mm and extends from second end 58 of base 54 about 10 mm toward first end 56, allowing bevel 34 with shoulder 36 or collar 27 to pass through with a slight application of compressive force. The inward compressive force slightly decreases on a temporary basis, the maximum external diameter of the sealing surface, thereby permitting penetration of either sealing surface tip 32 or tube tip 29 into central base 62 of cylindrical base 54. Due to the diameter of the polymer of the sealing surface, the surface compression is relieved naturally past penetration into the cavity. At operative base point 66 near first end 56 of base 54, aperture 60 may be radiused or beveled to accommodate any requisite dimensions while maintaining a maximum available area of wall to maintain structural integrity of wall 60.

Connector 26 also includes a cylindrical collar 68 disposed at second end 58 of base 54 and longitudinally aligned with base 54. Cylindrical collar 68 includes a first end 70, a second end 72 and a wall 74. First end 70 of collar 68 is connected to second end 58 of base 54 by shoulder 80, as will be described in detail below, thereby forming an integral unit. Collar 68 defines an outer diameter that is less than the outer diameter defined by cylindrical base 54, but is dimensional to accommodate the external diameter of tube shaft 28 and/or optional collar 33. Optionally, the outer diameter of collar 68 may be less than the inner diameter of cylindrical base 54.

Wall 74 of cylindrical collar 68 defines a gap 76 that extends essentially parallel to the longitudinal axis of collar 76 and down the entire length of collar 76, i.e., from first end 70 through second end 72. The width 78 of gap 76 is slightly smaller than or essentially equivalent to the outer diameter of shaft 28 (referring back to FIG. 3) of tube 24, allowing shaft 28 to pass through gap 76 to a central bore 79 defined by collar 68, with the application of a slight force. The application of force to press shaft 28 through gap 76 causes shaft 28 to deform slightly, allowing it to pass through gap 76 into central bore 79. Upon reaching central bore 79, which is of a diameter that approximates the outer diameter of shaft 28, the returns to its respective pre-deformation shape, owing to their construction from polymeric material, as is known in the art.

Providing the connection between first end 70 of collar 68 and second end 58 of base 54 is a shoulder 80. Shoulder 80 extends about at least a portion of the circumferences of each of first end 70 of collar 68 and second end 58 of base 54. Shoulder 80 does not extend across the circumferences of second end 58 of base 54 and first end 70 of collar 68 at an area 82 corresponding to where aperture 64 and gap 76 are respectively defined. A second, opposing area 84 across which shoulder 80 does not extend may also optionally be defined.

In this manner, shoulder 80 provides the structural connection between base 54 and collar 68. As a result, base 54 and collar 68 of receiving member 26 are longitudinally aligned about a single central axis to form a symmetrical unit. Moreover, aperture 64 of base 54 and gap 76 of collar 68 are longitudinally aligned to facilitate insertion of tube 24, as will be described below.

Optionally included on connector member 26 is at least a pair of opposing wings 86 that extend from the outer surface of collar 68 parallel to the longitudinal axis of collar 68. Wings 86 extend from second end 72 of collar 68 along the length of collar 68 to first end 70 and, hence, shoulder 80. In the illustrated embodiment, wings 86 extend radially to a distance that is slightly less than the outer diameter of base 54. Wings 86 allow connector member 26 to be handled and rotated more easily. Of course, wings 86 may optionally extend past second end 72 of collar 68 and out to or past the outer diameter of base 54, as particular requirements of an application dictate.

Figure 10:
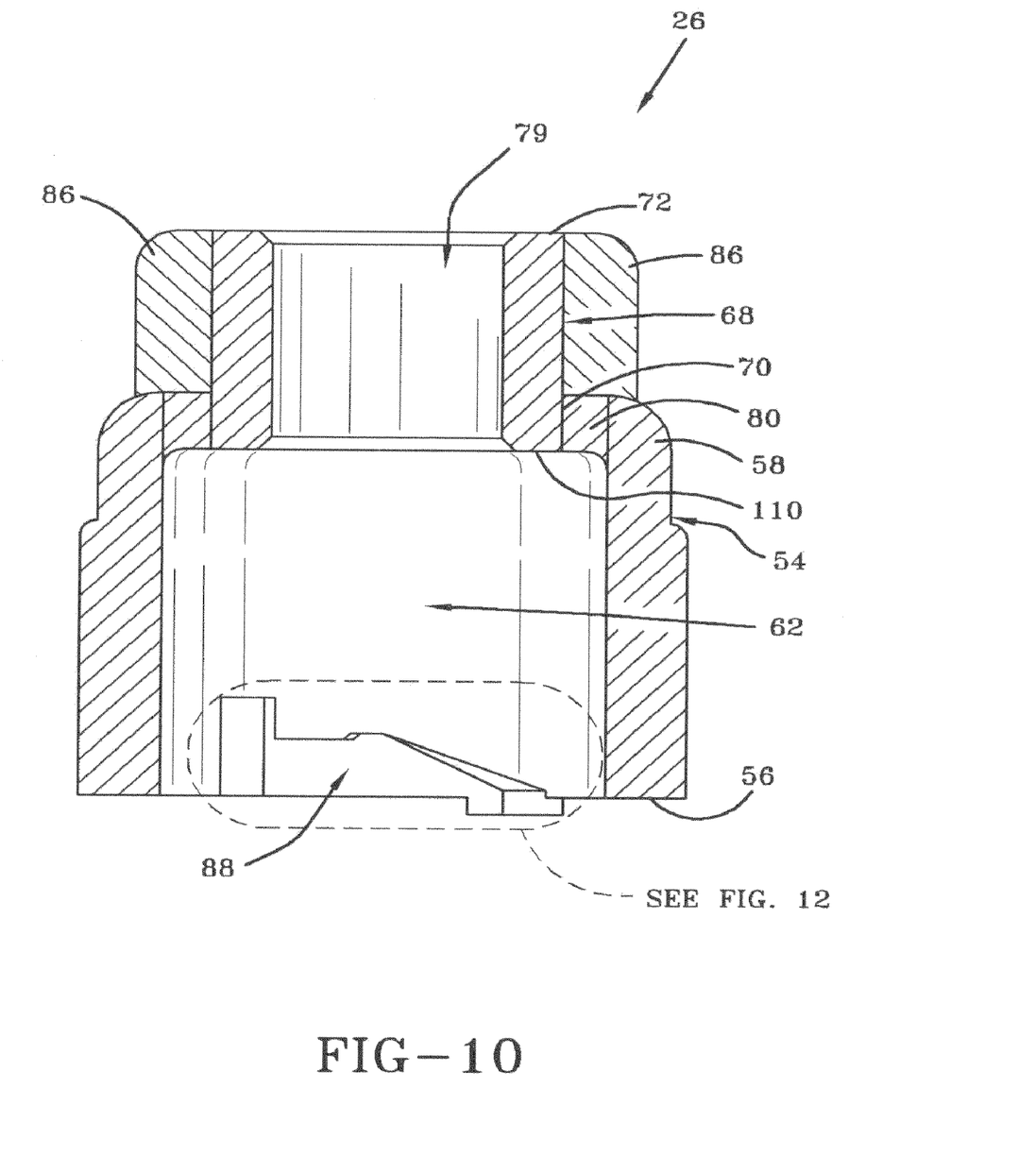
FIG. 10 is a side cross-sectional view of the fastening connector of FIG. 6, taken down the center of the member along line 10—10 in FIG. 6.
Figure 11:
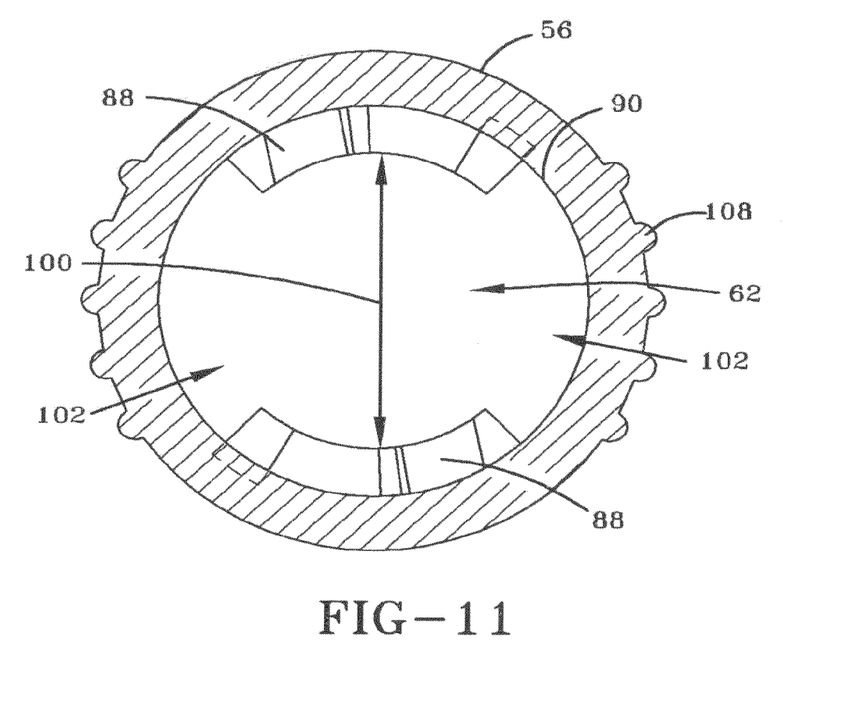
FIG. 11 is top cross-sectional view of the fastening connector of FIG. 9, taken across a lower portion of the member along line 11—11 in FIG. 9.
Figure 12:
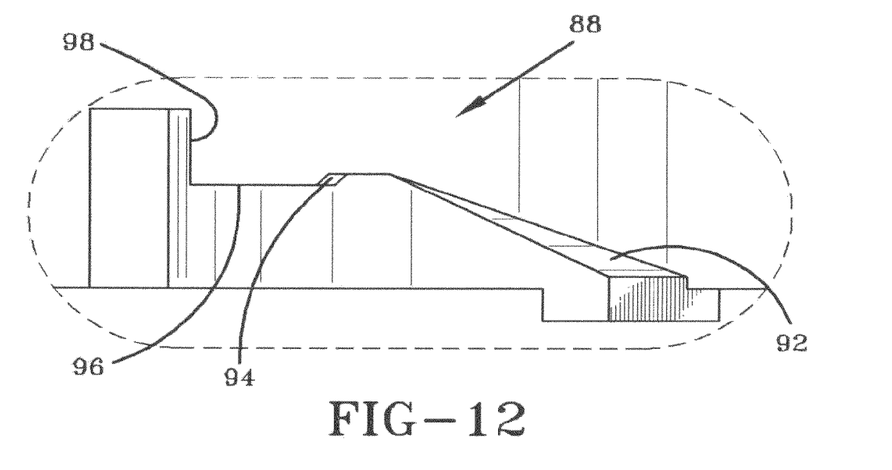
FIG. 12 is an enlarged view of a portion of the fastening connector of FIG. 10, as designated by the circled area in FIG. 10.

Turning now to FIGS. 10–12, projections 88 of connector member 26 are shown. At least two projections 88 extend about a portion of the inner surface or circumference 90 of cylindrical base 54 at its first end 56 and extend into central bore 62. Projections 88 are opposed about the inner diameter of base 54. Each projection 88 includes a ramp 92 that leads to a retaining wall 94 which is in turn connected to a locking surface 96 and terminates in a stopping wall 98. Projections 88 cooperate with tabs 50 of insertion member 22 (referring back to FIGS. 4–5) to secure the connection of connector member 26 and receiving member 22.

With additional reference to FIGS. 4–5, outer diameter 48 of cylindrical body 40 of receiving member 22 is slightly less than the distance 100 between opposing projections 88 across central bore 62. For example, distance 100 may be approximately 11.5 mm and outer diameter 48 may be about 10.5 mm to about 11.0 mm. In this manner, cylindrical body 40 is able to pass into central bore 62 of connector member 26.

In the area 102 about the inner circumference 90 of base 54 of connector member 26 where projections 88 do not extend, tabs 50 pass through. For example, in the illustrated embodiment, central bore 62 is of a diameter of about 15 mm. Each tab 50 extends radially outward from the 11.0 mm cylindrical body 40 to a maximum of about 1.9 mm. Thus, tabs 50 pass into open areas 102 between projections 88 when first end 56 of receiving member 22 is inserted into central bore 62 of base 54 of connector member 26. An incline 104 on each tab 50 facilitates ease of insertion of first end 42 of cylindrical body 40 of receiving member 22 into connector member 26.

As first end 42 of receiving member 22 is inserted into central bore 62 of base 54 and reaches a point approaching second end 58 of base 54, an engagement surface 106 of each tab 50 longitudinally passes the corresponding ramp 92 of the projections 88 of the connector member 26. Once tabs 50 reach this point, the connector member 26 is rotated, causing projections 88 to pass along engagement surfaces 106 of each corresponding tab 50. Thus, ramps 92 pass along corresponding engagement surfaces 106, as do retaining walls 94 and locking surfaces 96. When stopping wall 98 of each projection 88 contacts corresponding tab 50, each tab is held in place between retaining wall 94 and stopping wall 98, with engagement surface 106 of each tab 50 in contact with corresponding locking surface 96 of each projection 88.

Referring generally now to FIGS. 2–12, the rotation to accomplish the locking engagement of receiving member 22 in connector member 26 is about one-quarter of the outer circumference of base 54 of connector member 26. Base 54 of connector member 26 optionally includes a plurality of opposing sets of ribs 108 extending longitudinally from first end 56 to second end 58 on the outer surface of wall 60 to allow easier gripping and rotation of connector member 26.

Having thus described the attributes and features of components of the invention 20, a description of the assembly of connection 20 is in order. Depending on configuration, sealing surface end 32 or tubing end 29 of tube 22 is passed through aperture 64 of base 54 of connector member 26 and continues into central bore 62 of base 54 and past first end 56 of base 54. Bevel 34 follows the respective end through aperture 64 into central bore 62. Once radiused or beveled surface 34 or cone-shaped surface 34a is in central bore 62, collar 68 of connector member 26 is moved, such as by pressing on wings 86, to cause shaft 28 of tube 24 below sealing surface bevel 34 or 34a to pass through gap 76 in collar 68 and into central bore 79 of collar 68.

Because gap 76 is typically slightly narrower than the outer diameter of shaft 28 of tube 24, a slight force is required to snap shaft 28 through gap 76. Once shaft 28 is through gap 76 and in central bore 79, the inner diameter of collar 68, which is approximately the same as the outer diameter of shaft 28, allows connector member 26 to reside on tube 24 without slipping down tube 24 without assistance from a user. Once tube 24 is in position, i.e., shaft 28 is in central bore 79 of collar 68 and sealing surface bevel 34 or 34a is in central bore 62 of base 54 of receiving member 26, connector member 26 is slid along tube 24 toward sealing surface end 32 or tubing end 29 depending on the configuration. The movement of connector member 26 stops when end surface 110 of first end 70 of collar 68 contacts shoulder 36 of sealing surface bevel 34 or 34a of tube 24.

Sealing surface end 32 or tubing end 29 of tube 24 is then inserted into central bore 46 of receiving member 22. Tube 24 is moved toward receiving member 22, causing the appropriate end 32 or 29 to continue along central bore 46, until first end 42 of receiving member 22 contacts sealing surface bevel 34 or 34a or comes in communication with rubber o-ring 38. Specifically, the outer diameter of shaft 28 of tube 24 is slightly less than the diameter of central bore 46 defined by body 40 of receiving member 22, allowing this member to receive either sealing surface end 32 or tubing end 29 of tube 24 in central bore 46. Because sealing surface bevel 34 or 34a increases radially from the outer diameter of tube 24 (at end 32 or 29) to a distance that is greater than the diameter of central bore 46 of body 40 of receiving member 22 (at shoulder 36), end 32 or 29 and bevel 34 or 34a or o-ring 38 extend into central bore 46 until first end 42 of cylindrical body 40 uniformly contacts at the appropriate location. This contact of first end 42 on the appropriate sealing surface assists with the creation of sealing plumbing connection 20.

In a more preferred embodiment, a rubber o-ring 38 is disposed in a channel (not shown) positioned about a circumference of the sealing surface. The gasket or o-ring cooperates with the inner diameter of cylindrical body 40 to establish a more complete seal, thereby eliminating leaks at connection 20.

During the movement of end 32 or 29 into central bore 46 of receiving member 22, first end 42 of insertion member 22 passes into central bore 62 of base 54 of connector member 26, due to the proximate contact of end surface 110 of collar 68 with shoulder 36 of tube 24. As described above, tabs 50 pass through area 102 where the projections 88 of receiving member 26 do not extend.

Connection 20 is secured when receiving member 22 is inserted into central bore 62 of base 54 of connector member 26. When receiving member 22, containing bevel 34 or 34a of tube 24 in its central bore 46 is inserted into central bore 62 of base 54 of connector member 26, shoulder 36 of bevel 34 or 34a is forced into secure contact with an end surface 110 of first end 70 of collar 68 of connector member 26. Connector member 26 is turned to effectuate engagement of projections 88 with tabs 50, as described above, causing shoulder 36 to contact end surface 110 and surface 106 of each tab 50 to contact corresponding locking surfaces 96 of projections 88, creating a resulting force that keeps first end 42 of receiving member 22 sealingly engaged with bevel 34 or 34a of tube 24.

Thus, using the present invention, the requirement of insertion of a threaded nut 16 (referring back to FIG. 1) prior to fabrication of an opposed sealing end 14 is eliminated. The connection of the present invention 20 may be made in the field, rather than in the production process, saving expense and time in production. Also, the ability of connector member 26 to be installed in the field allows connection 20 to be made without the added expense and time of replacing sections of tubing that require the presence of the already-installed threaded nut 16 of the prior art. Furthermore, installation of connector member 26 is relatively quick and easy, with sealing connection 20 being made with only a quarter-turn of connector member 26, as opposed to multiple complete turns. Hence, additional time and effort is saved with the apparatus of the present invention.

Of course, the invention 20 may include other embodiments than those described above. For example, there may be more than two projections 88 on connector member 26, such as three or four. In such an instance, there will still be an area 102 in between the projections 88 through which corresponding tabs 50 may pass. Also, other means of engaging projections 88 than tabs 50 may be utilized on insertion member 22. Such means may include ramp-like projections that mirror projections 88 of connector member 26, as well as studs, knobs and other similar protrusions.

The outer diameter of collar 68 of connector member 26, while described above as less than the outer diameter of base 54 of connector member 26, may be equal to or greater than the outer diameter of base 54, as the application dictates. Moreover, second end 44 of receiving member 22 may be integrally connected to another tube or fitting, or to a flange 112 (as shown in FIG. 2). In this manner connection 20 provides a wide variety of plumbing connections.

While the precise composition of the polymer used in either the connector member, or the receiving member or the tube itself is not limited to any one composition or specified polymer, and in fact, the polymer can be a thermoplastic or a thermoset. In the practice of this invention, illustrative and non-limiting examples of the polymers which may be used in various combinations would include: polyolefins, polycarbonates, polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Additionally included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art.

Non-limiting example of polymers of monoolefins and diolefins, for example would include polypropylene, polyisobutylene, polybutene-1, polymethylpentene-1, poly-isoprene or polybutadiene, as well as polymers of cycloolefins, for instance of cyclopentene or norbornene, polyethylene (which optionally can be crosslinked), for example high density polyethylene (HDPE), low density polyethylene (LDPE), medium density polyethylene (MDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EAA.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, such as acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane] terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with poly-olefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

It is also possible that through the incorporation of various additives in the polymeric compositions, e.g., glass fibers, heat stabilizers, anti-oxidants, plasticizers, etc., the softening temperatures of the polymers may be controlled.

This invention has been described in detail with reference to a specific embodiment thereof, including the respective best mode for carrying out the embodiment. It shall be understood that this illustration is by way of example and not by way of limitation. Accordingly, the scope and content of the present invention are to be defined only by the terms of the appended claims.

The invention claimed is:

1. A fastened tubing connection, comprising:
   (a) a tube, including:
      (i) a shaft with an operational end; and
      (ii) a sealing surface on the shaft proximate the operational end, wherein the sealing surface includes a shoulder;
   (b) a connector member, including:
      (i) a cylindrical base that includes a first end, a second end and a wall having a gap in the wall and a first central bore;
      (ii) at least two uniformly spaced projections, extending from an inner surface of the wall into the first central bore proximate the first end of the base;
      (iii) a cylindrical collar that includes a first end disposed proximate the second end of the base and a wall with an outer diameter that is less than the outer diameter of the wall of the cylindrical base, wherein the wall defines the gap and the collar defines a second central bore; and
      (iv) a shoulder connected to and extending between the second end of the base and the first end of the collar along at least a portion of the respective circumferences of the base and the collar;
   (c) a receiving member, including:
      (i) a cylindrical body that includes a first end, a second end and an outer diameter that is less than the distance between the at least two uniformly spaced projections on the base of the connector member across the diameter of the first central bore, and defines a third central bore; and
      (ii) means to engage at least a portion of the body of the receiving member in the first central bore; and
   (d) whereby the sealing surface of the tube passes through the aperture in the base of the connector member into the first central bore and the shaft of the tube above the shoulder passes through the gap in the collar to the second central bore, allowing the shoulder of the sealing surface to contact an end surface of the collar at the first end of the collar of the connector member, and the receiving member secures the shoulder and end surface in contact with one another by receiving the operational end of the shaft in the third central bore while the means to engage the receiving member in the first central bore are engaged.

2. The connection of claim 1, wherein the means to engage at least a portion of the body of the receiving member in the first central bore include at least two opposing tabs projecting from the outer surface of the cylindrical body proximate the first end of the body.

3. The connection of claim 2, wherein there are two uniformly spaced projections on the receiving member and each projection includes a locking surface, and wherein each of the two tabs contacts a respective locking surface to effectuate the engagement of the receiving member in the connector member.

4. The connection of claim 3, wherein the engagement of the receiving member in the first central bore of the connector member is effectuated with a turn of the connector member that is approximately one-quarter of the circumference of the outer surface of the receiving member.

5. The connection of claim 1, wherein the bevel on the shaft defines a channel about its circumference and includes a supplemented sealing means disposed in said sealing means.

6. The connection of claim 5 wherein said supplemental sealing means is a gasket.

7. The connection of claim 6 wherein said gasket is an o-ring.

8. The connection of claim 1, wherein the projections are opposed about the first central bore.

9. The connection of claim 1, further comprising a pair of opposing wings projecting from the outer surface of the collar and extending parallel to the longitudinal axis of the collar along the length of the collar.

10. A fastened tubing connection, comprising:
    (a) a tube, including:
       (i) a shaft with an operational end; and
       (ii) a sealing surface on the shaft proximate the operational end, wherein the sealing surface includes a shoulder;
    (b) a connector member, including:
       (i) a cylindrical base that includes a first end, a second end and a wall;
       (ii) at least two uniformly spaced projections, extending from an inner surface of the wall into the first central bore proximate the first end of the base;
       (iii) a cylindrical collar that includes a first end disposed proximate the second end of the base and a wall with an outer diameter that is less than the outer diameter of the wall of the cylindrical base; and
       (iv) a shoulder connected to and extending between the second end of the base and the first end of the collar along at least a portion of the respective circumferences of the base and the collar;
    (c) a receiving member, including:
       (i) a cylindrical body that includes a first end, a second end and an outer diameter that is less than the distance between the at least two uniformly spaced projections on the base of the connector member across the diameter of the first central bore, and defines a third central bore; and
       (ii) means to engage at least a portion of the body of the receiving member in the first central bore; and
    (d) whereby the sealing surface of the tube passes through the aperture in the base of the connector member into the first central bore and the shaft of the tube above the sealing surface shoulder passes through the collar to the second central bore, allowing the shoulder of the sealing surface to contact an end surface of the collar at the first end of the collar of the connector member, and the receiving member secures the shoulder and end surface in contact with one another by receiving the operational end of the shaft in the third central bore while the means to engage the receiving member in the first central bore are engaged.

11. The connection of claim 10, wherein the means to engage at least a portion of the body of the receiving member in the first central bore include at least two opposing tabs projecting from the outer surface of the cylindrical body proximate the first end of the body.

12. The connection of claim 11, wherein there are two uniformly spaced projections on the receiving member and each projection includes a locking surface, and wherein each of the two tabs contacts a respective locking surface to effectuate the engagement of the receiving member in the connector member.

13. The connection of claim 12, wherein the engagement of the receiving member in the first central bore of the connector member is effectuated with a turn of the connector member that is approximately one-quarter of the circumference of the outer surface of the receiving member.

14. The connection of claim 10, wherein the bevel on the shaft defines a channel about its circumference and includes a supplemented sealing means disposed in said sealing means.

15. The connection of claim 14 wherein said supplemental sealing means is a gasket.

16. The connection of claim 15 wherein said gasket is an o-ring.

17. The connection of claim 10, wherein the projections are opposed about the first central bore.

18. The connection of claim 10, further comprising a pair of opposing wings projecting from the outer surface of the collar and extending parallel to the longitudinal axis of the collar along the length of the collar.

* * * * *